United States Patent
Deleris et al.

(10) Patent No.: US 7,357,870 B2
(45) Date of Patent: Apr. 15, 2008

(54) METHOD FOR REDUCING PRODUCTION OF WASTEWATER TREATMENT STATION SLUDGE WITH FIXED BIOLOGICAL CULTURES

(75) Inventors: Stephane Deleris, Chatou (FR); Thierry Lebrun, Villecresne (FR)

(73) Assignee: Degremont, Malmaison (FR)

( * ) Notice: Subject to any disclaimer, the term of this patent is extended or adjusted under 35 U.S.C. 154(b) by 22 days.

(21) Appl. No.: 10/528,692

(22) PCT Filed: Sep. 24, 2003

(86) PCT No.: PCT/FR03/02806

§ 371 (c)(1),
(2), (4) Date: Mar. 22, 2005

(87) PCT Pub. No.: WO2004/028979

PCT Pub. Date: Apr. 8, 2004

(65) Prior Publication Data

US 2006/0000770 A1  Jan. 5, 2006

(30) Foreign Application Priority Data

Sep. 25, 2002  (FR) ................... 02 11860
Dec. 5, 2002   (FR) ................... 02 15384

(51) Int. Cl.
    C02F 3/00   (2006.01)
(52) U.S. Cl. .................................................. 210/615
(58) Field of Classification Search ........ 210/620–629, 210/220, 615

See application file for complete search history.

(56) References Cited

U.S. PATENT DOCUMENTS 3,718,582 A * 2/1973 Smith et al. ................ 210/610
4,370,235 A   1/1983 Shioya et al.
5,013,429 A   5/1991 Krofta
5,141,646 A   8/1992 Rozich
6,224,769 B1 * 5/2001 Hasegawa et al. .......... 210/606

FOREIGN PATENT DOCUMENTS

| EP | 0 384 162 A | 8/1990 |
| EP | 1 254 865 A | 11/2002 |
| FR | 2 766 813 A1 | 2/1999 |
| JP | 10 052697 A | 2/1998 |
| JP | 10052697 A * | 2/1998 |
| JP | 10 057994 A | 3/1998 |
| JP | 10057994 A * | 3/1998 |
| JP | 10 137780 A1 | 5/1998 |
| JP | 10137780 A * | 5/1998 |
| WO | WO 99 41205 A | 8/1999 |

* cited by examiner

*Primary Examiner*—Chester T. Barry
(74) *Attorney, Agent, or Firm*—Connolly Bove Lodge & Hutz LLP

(57) ABSTRACT

A method for reducing the amount of wastewater treatment station sludge first performs wastewater purification with fixed biological cultures from which excess sludge is extracted intermittently during phases of washing and unclogging. Then, the water from the washing phase that provides fixed biological cultures is subjected to biological activated sludge treatment, the outlet of this stage does not recycle effluent to the front end of the water treatment line. The wastewater is then subjected to a stage of reduced sludge production (RPB), selectively, by thermophilic enzymatic action or by partial oxidation by ozone introduced by mechanical stirring, this stage being supplied by quantities of sludge from the step of biological treatment by activate sludge, the substrate source for the bacteria of the biological treatment including organic material derived from lysed bacterial cells induced during the RSP stage.

1 Claim, 1 Drawing Sheet

METHOD FOR REDUCING PRODUCTION OF WASTEWATER TREATMENT STATION SLUDGE WITH FIXED BIOLOGICAL CULTURES

The present invention relates to a method and a device for reducing the production of municipal or industrial wastewater treatment station sludge, with fixed biological cultures.

It is known that wastewater purification by the biological method consists in using the organic and nitrogen pollution as a nutrient substrate for the purifying biomass, said carbon and nitrogen pollution being converted to carbon dioxide and to nitrogen, while the biomass proliferates in proportion to the quantity of pollution degraded. The surplus biomass formed constitutes what is commonly referred to as excess biological sludge.

The treatment and final disposal of this sludge is a major environmental and economic challenge. With a forecast annual production, in 2002, of more than 1 200 000 tonnes of dry matter per year for municipal wastewater treatment in France, and more than 10 million tonnes for the European Community, it is clear that the management of the production and treatment of the sludge produced by the purifying stations constitutes a growing preoccupation, amplified by the new regulatory, environmental, health, economic, indeed political and psychological constraints.

Conventional techniques for the disposal of this waste include in particular dumping, agricultural upgrading and incineration. However, these known techniques have serious drawbacks.

Thus the prohibition of dumping of non-ultimate waste, the stringent constraints (especially with respect to heavy metals and certain suspect organic compounds) for agricultural upgrading, the control of the costs and risks of air pollution by incineration, will weigh heavily on the disposal of this waste.

In this context, new technologies have been envisaged, with the aim of reduced sludge production (RSP) from municipal and industrial biological wastewater treatment installations. Some of these RSP techniques are based on the combination of a conventional activated sludge method and a sludge treatment installed in a loop on the aeration tank.

The associated treatment can draw on mechanical, chemical, thermal or biological techniques, and is often based on the combination of two or more of these techniques.

It has been considered to carry out the RSP treatment step by enzymatic degradation (described in particular in EP-A-924 168) or by partial oxidation with ozone combined with mechanical stirring (according to WO 99/06327), installed in parallel and in a loop on the biological tank. These two techniques are highly efficient and, for certain methods, significantly reduce sludge production, by even more than 80%.

FIG. 1 of the appended drawings shows a diagram of a known installation of this type, comprising, in a loop on an aeration tank, a reduced sludge production device which can be an aerobic thermophilic reactor or a partial oxidation unit with ozone producing mechanical stirring. In this figure, the numeral 1 designates the introduction of the wastewater to be treated, which passes respectively through an anaerobic zone R, an anoxic zone X, an aerobic zone A, before being treated in a clarifier C. The RSP reactor, designated as a whole by the letter B, is mounted in parallel and in a loop on the activated sludge treatment installation (C/N/P treatment).

An example of the technical characteristics of such a known installation are given below:
Equivalent number of inhabitants: 50 000 eq-Hab
Daily throughput: 7 500 $m^3$/day
Sludge production: 3 000 kg-SM/day
Volume of station: 15 000 $m^3$ In this method, a fraction of the sludge present in the aeration tank is sent continuously and possibly after thickening to the reduced sludge production device. Depending on the degree of reduced sludge production required, the quantity of sludge sent daily to the RSP is equivalent to 1 to 10 times the quantity of sludge produced by the water treatment installation in conventional operating conditions. The effluent leaving the RSP loop consists of compounds solubilized in the RSP device and suspended matter. In the example shown in FIG. 1, the installation produces excess sludge of 600 kg SM/d (or 80% RSP).

In the case of biological treatment systems of the "fixed biomass" type, also called "fixed cultures", the surplus sludge is extracted during the washing and declogging phases. In this case, it is difficult to apply an RSP method in a loop on the water treatment line, particularly for the following reasons:

The installation of an RSP method in a loop on a fixed biomass type installation would lead to the reintroduction of a large quantity of lyzed biomass and SM at the head end of the installation. This operating mode is not readily compatible with the load of suspended matter supported by fixed biomass installations, which is severely limited because of clogging problems.

The excess biomass on fixed biomass biological treatment installations is extracted in batches during washing phases. This extraction mode is incompatible with the operating mode of the RSP loop, which must enable the treatment of a quantity equivalent to 1 to 10 times the sludge production of the conventional system.

To solve the problems thus raised by the reduction of sludge production of wastewater treatment stations with fixed biological cultures, the present invention contrasts with the prior art reviewed above, by dissociating the step of reducing sludge production from the purifying step, by providing a step of activated sludge type biological treatment with low, medium or high load, associated with a reduced sludge production (RSP) step by thermophilic enzymatic method, or by partial oxidation with ozone combined with mechanical stirring. The substrate source for the biological treatment bacteria is no longer the organic matter in the wastewater, but the organic matter derived from the lyzed bacterial cells induced during the RSP step.

The present invention further relates to a device for putting into practice the method specified above, in the form of an installation dedicated to reducing sludge production associating an RSP device, with a reactor for biological treatment with low, medium or high load where the substrate source for the bacteria consists of the organic matter derived from the lyzed bacterial cells induced in the RSP reactor.

Other features and advantages of the present invention will appear from the description given below, with reference to the drawings appended hereto which illustrate a non-limiting embodiment. In the drawing.

Figure 1:
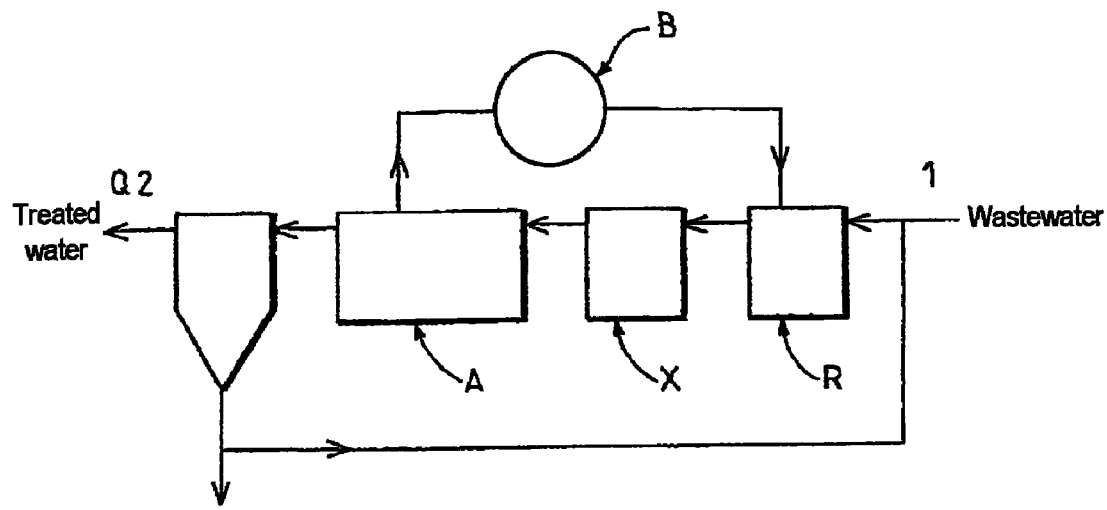
FIG. 1 illustrates the prior art mentioned above.
Figure 2:
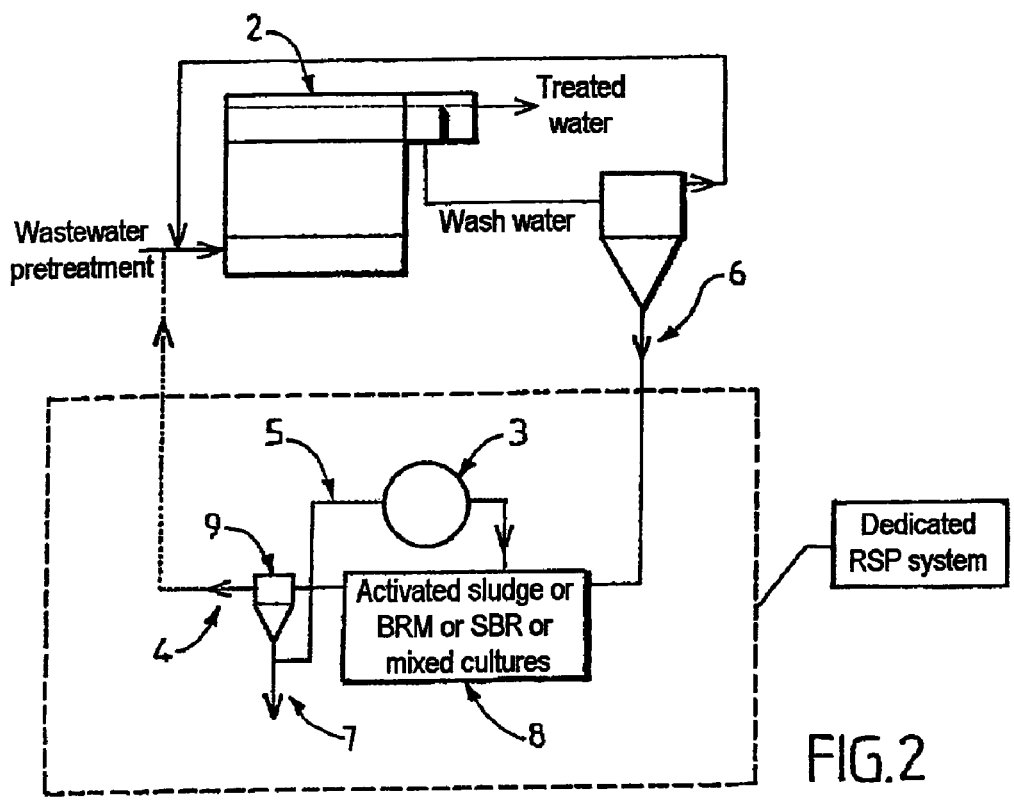
FIG. 2 shows the diagram of an installation putting into practice the method of the invention.

Reference to this FIG. 2 shows that this installation is in the form of a platform dedicated to reducing sludge production, which is associated with an installation for wastewater treatment by fixed biomass reactor (for example, biofilter), designated as a whole by the numeral 2. This dedicated platform consists of an RSP device, designated as a whole by the numeral 3, combined with a biological treatment, carried out in a reactor designated by the numeral 8 and comprising a separation-thickening device 9. As shown in this FIG. 2, the organic matter derived from the lyzed bacterial cells induced during the RSP step is the substrate source for the biological treatment in the reactor 8.

Thanks to the invention, it is possible to design a dedicated biological system for reduced sludge production in a very different manner from the wastewater treatment system, allowing a gain in compactness and in efficiency, without having to comply fully with the required treatment constraints for water purification (recycle of the effluent at the front end of the water treatment line, arrow 4).

The cyclic character of the extractions raises no problem for running the RSP device, which can be supplied continuously by withdrawing sludge, after possible thickening, from the separator-thickener 9 of the dedicated system (at 5), the reactor 8 collecting the wash water from the reactor 2. The present invention offers the further advantage of permitting the objective measurement of the reduced quantity of sludge. The reduction in sludge production is calculated from the difference between the quantity of sludge extracted from the water treatment line (at 6) and the quantity of residual sludge extracted (at 7) on the dedicated RSP system.

By way of example, the characteristic data of an embodiment of an installation according to FIG. 2 are given below:

Fixed biomass reactor 2
    Equivalent number of inhabitants: 200 000 eq-Hab
    Average daily throughput: 30 000 m$^3$/day
    Sludge production of biological treatment stage: 3 500 kg-SM/day
    Dedicated RSP system
    Daily throughput: 3 500 m$^3$/day
    Volume of biological treatment: 1 200 m$^3$
    Volume of enzymatic thermophilic reactor: 650 m$^3$
    Sludge production: 350 kg SM/day (90% RSP)

Such a device helps to address the drawbacks of the application, at the fixed biomass biological treatment stations, of the RSP processes directly integrated in a loop. It also provides the following advantages:

- possibility of adjusting sludge reduction as required (20 to 100% reduction);
- possibility of treating biofilter wash water;
- possibility of designing a biological sludge reduction device for a purification level much lower than the purification level required for actual wastewater treatment;
- dimensioning of the RSP device for a hydraulic throughput 5 to 50 times lower than the throughput of the purification station that generated the sludge; and
- possibility of adapting the oxygenation capacity and the air or oxygen diffusion mode independently of that of the station that generated the sludge.

It is obviously understood that the present invention is not limited to the embodiment described and shown here, but includes all possible variants thereof.

The invention claimed is:

1. A method for reducing the amount of wastewater treatment station sludge, comprising the steps:
   purifying the wastewater with fixed biological cultures from which excess sludge is extracted intermittently during phases of washing;
   sending the water coming from each washing phase that provides fixed biological cultures to a solid/liquid separator from which a quantity of sludge is extracted;
   subjecting by biological activated sludge treatment, said extracted quantity of sludge, the outlet of this stage not recycling effluent to the front end of a water treatment line of the wastewater treatment station;
   subjecting part of effluent coming from the biological activated sludge treatment to a stage of reduced sludge production (RSP) by thermophilic enzymatic action or by partial oxidation by ozone introduced by mechanical stirring, this stage of RSP being supplied by quantities of sludge from the step of biological treatment by activated sludge, the substrate source for the bacteria of the biological treatment including organic material derived from lysed bacterial cells induced during the RSP stage.

* * * * *